Jan. 8, 1929.
C. E. NORCROSS
1,698,506
GLASS CUTTING TABLE
Filed Sept. 2, 1927
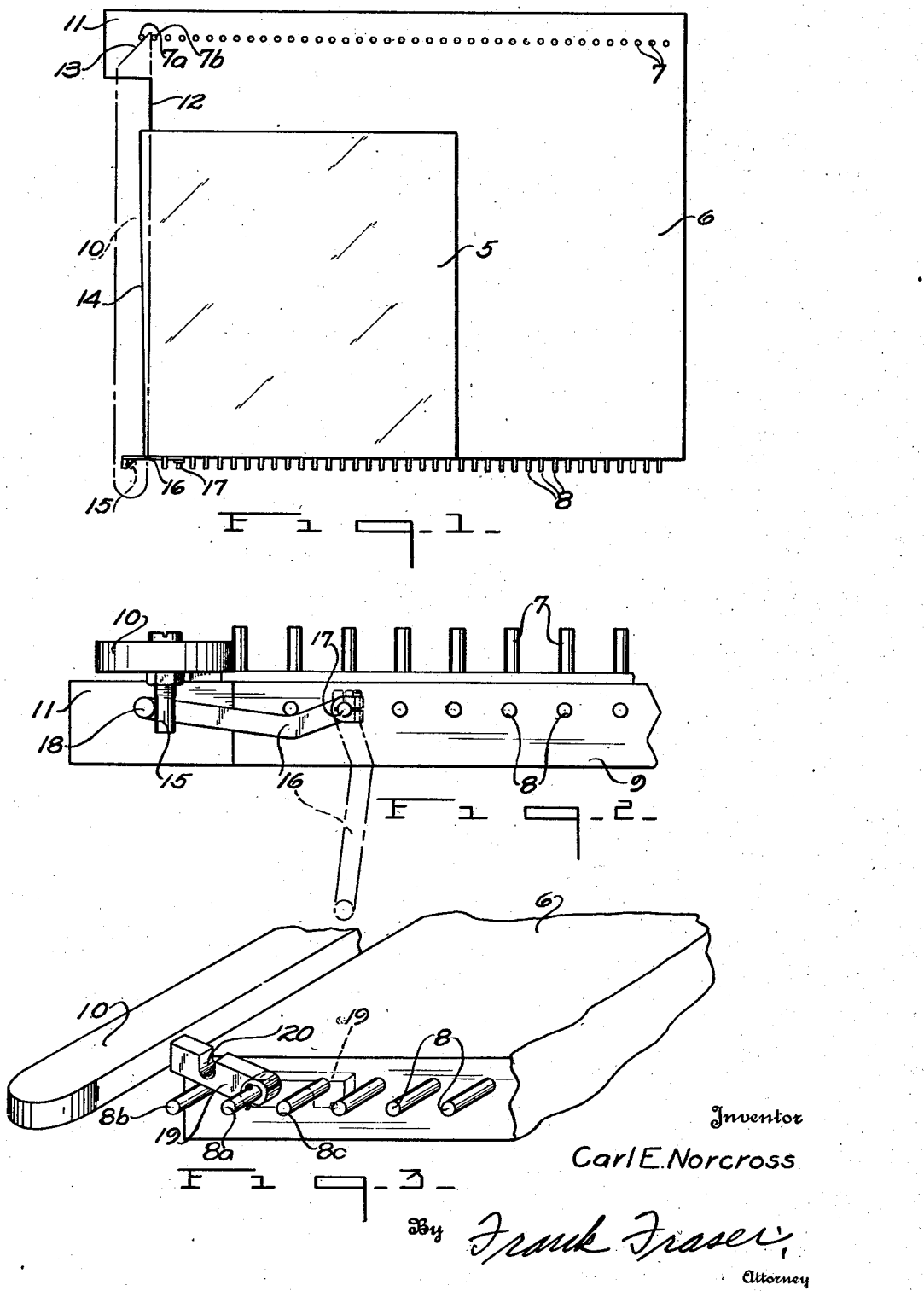
Inventor
Carl E. Norcross
By Frank Fraser
Attorney Patented Jan. 8, 1929.

1,698,506

UNITED STATES PATENT OFFICE.

CARL E. NORCROSS, OF CHARLESTON, WEST VIRGINIA, ASSIGNOR TO THE LIBBEY-OWENS SHEET GLASS COMPANY, OF TOLEDO, OHIO, A CORPORATION OF OHIO.

GLASS-CUTTING TABLE.

Application filed September 2, 1927. Serial No. 217,094.

The present invention relates to an improved form of glass cutting table on which sheets of glass may be properly squared and cut.

An important object of the invention is to provide a glass cutting table having a cutter guide associated therewith, and means whereby said cutter guide may be effectively held against displacement during the squaring of the sheet.

A further object of the invention is to provide a glass cutting table wherein a straight edge acting as a cutter guide is associated therewith, the straight edge being adapted to rest upon the glass sheet during the squaring and cutting thereof, and means being provided for effecting the alignment of the straight edge with the adjacent edge of the table during the squaring of said sheet.

Other objects and advantages of the invention will become more apparent during the course of the following description when taken in connection with the accompanying drawings.

In the drawings forming a part of this application and wherein like numerals are employed to designate like parts throughout the same.

Fig. 1 is a top plan view of a glass cutting table constructed in accordance with the present invention.

Fig. 2 is a front edge view thereof, and

Fig. 3 is a perspective view of a slightly modified construction.

The sheet of glass 5 to be cut is adapted to be laid upon the cutting table 6 and if desired, this table may be covered with any suitable material to prevent injury to the surfaces of the glass sheet laid thereon. Near the rear edge of the table is arranged a series of small vertically projecting pins 7 and a second series of forwardly directed pins 8 are arranged along the forward edge 9 thereof.

A straight edge 10 is adapted to extend between the pins 7 and 8 and to act as a guide for the cutting tool which is drawn across the sheet to score the same. The present invention consists especially in the manner in which the straight edge may be firmly held in proper position during the squaring of the sheet so that there will be no danger of its slipping or moving, thereby spoiling the cut.

The table 6 is provided preferably at its rear left hand corner with an extension 11 and the adjacent pin 7ª is carried thereby outwardly of the side edge 12 of table 6. The rear end of the straight edge is pointed as at 13 and is adapted, when in position for squaring the sheet, to be received between the first pin 7ª and second pin 7ᵇ.

In ordinary practice, when squaring a sheet, the forward edge thereof is first aligned with the front edge of the table in a manner that the left side edge of the sheet, which might not be perfectly straight, but which instead might be cut at an angle as indicated at 14, extends beyond the edge 12 of the table. To square this edge, the operator would position the pointed end of the straight edge between the first and second upstanding pins 7ª and 7ᵇ and then simply by sight, endeavor to align the inner edge of the straight edge with the edge 12 of the table and then hold the same firmly in such position while drawing the scoring or cutting tool in contact therewith over the sheet. However, it has been found to be very difficult to hold the straight edge rigidly so that it will not move during the scoring operation, and which movement tends to spoil the cut.

In accordance with the present invention, means is provided for effectively preventing relative movement between the sheet and cutter guide or straight edge during the scoring operation so that a straight cut will be assured. To accomplish this, there is passed vertically through the forward end of the straight edge 10 a bolt or pin 15 and a lever 16 pivoted at its inner end as at 17 to one of the pins 8 is provided at its outer end with a stop or the like 18 adapted to fit around the pin 15.

When cutting a sheet with my improved device, the said sheet of glass 6 is first laid upon the table and the front edge thereof aligned with the forward edge of the table in a manner that the crooked edge 14 thereof will extend beyond the side edge 12 of said table. In order to then square up the edge 14 of the sheet, the pointed end of the straight edge is positioned between the first and second pins 7ª and 7ᵇ and the lever 16 subsequently swung from the position shown in the dotted lines to the position shown by the full lines so that the stop 18 will engage the pin 15. The operator then urges the straight edge outwardly to firmly hold the pin 15 and stop 18 in contact with one another and when this is done, the inner edge of the straight edge will align with the edge of the table.

A suitable scoring tool can then be drawn along the straight edge to score the sheet and it will be evident that by the use of such arrangement as described, the straight edge can be properly aligned with the edge of the table and securely held in position during the scoring of said sheet so that a straight cut is assured. Upon completion of this cut, the lever 16 can simply be released whereupon it will swing to its dotted line position. The straight edge can then be moved over the table and utilized as a cutter guide to effect cutting of the sheet into strips of desired widths.

In the modified construction shown in Fig. 3, there is loosely mounted on one and preferably on the second pin 8$^a$ a stop member 19, said stop member being adapted when in operative position to rest upon the end pin 8$^b$. When in such position and the straight edge 10 is brought to abut the outer end thereof, the said straight edge will be in alignment with the adjacent edge of the cutting table. The upper surface of the stop member 19 may be formed with a notch or the like 20 and after the cut has been completed, the said stop can be swung out of the way so that the notch will engage the third pin 8$^c$ as indicated by the dotted lines.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. The combination of a table having a plane sheet supporting surface, pins arranged at the forward and rear ends of said table, a straight edge having one end received between and maintained in position by certain of said pins, and pivotally mounted means carried by one of the other pins and engaging the opposite end of the straight edge to effect alignment of said straight edge with adjacent edge of table.

2. The combination of a table having a plane sheet supporting surface, a plurality of spaced upstanding pins arranged at the rear end of the table and a plurality of spaced forwardly directed pins arranged at the forward end of table, a straight edge extending between said pins and having its rear end received between and maintained in position by said upstanding pins, and a stop member pivotally carried by one of said forwardly directed pins and engaging the forward end of the straight edge to effect alignment of said straight edge with the adjacent edge of table.

3. The combination of a table having a plane sheet supporting surface, a plurality of spaced pins arranged at the forward and rear ends of said table, a straight edge having one end received between and maintained in position by the rear pins, and a pivotally mounted member carried by one of the forward pins and engaging the straight edge to effect alignment thereof with the adjacent edge of said table.

4. The combination of a table having a plane sheet supporting surface and an extension at one rear edge projecting beyond the adjacent side edge thereof, spaced upstanding pins carried by said table and extension adjacent the rear edge thereof and forwardly directed pins arranged along the front edge of said table, a straight edge adapted to rest upon the glass sheet during the cutting thereof and having its rear end received between adjacent upstanding pins, and a stop member pivotally carried by one of the forwardly directed pins and adapted to engage the straight edge for lining up the inner edge thereof with the adjacent side edge of the table.

Signed at Charleston, in the county of Kanawha and State of West Virginia, this twenty-sixth day of August 1927.

CARL E. NORCROSS.